United States Patent [19]
Gaudet

[11] Patent Number: 5,974,517
[45] Date of Patent: Oct. 26, 1999

[54] METHOD AND SYSTEM FOR MOUNTING A SYSTEM PARTITION AS A LOGICAL DRIVE WHILE AN OPERATING SYSTEM IS OPERATIONAL BY MODIFYING A PARTITION TABLE

[75] Inventor: Rene Richard Gaudet, Cypress, Tex.

[73] Assignee: Compaq Computer Corporation, Houston, Tex.

[21] Appl. No.: 08/710,360

[22] Filed: Sep. 17, 1996

[51] Int. Cl.⁶ .............................. G06F 12/00; G06F 13/00
[52] U.S. Cl. ................ 711/173; 711/112; 713/1; 713/100
[58] Field of Search ...................... 711/112, 173, 711/153, 170, 114; 395/651, 653; 713/1, 100

[56] References Cited

U.S. PATENT DOCUMENTS

| | | | |
|---|---|---|---|
| 5,136,711 | 8/1992 | Hugard et al. ............................ | 713/2 |
| 5,675,769 | 10/1997 | Ruff et al. ............................ | 711/112 |

OTHER PUBLICATIONS

Unknown, reference pertaining to Windows NT, Chapter 4, "Raid for Speedier, Safer Disks," pp. 124–135 (date unknown).

Primary Examiner—Glenn Gossage
Attorney, Agent, or Firm—Akin, Gump, Strauss, Hauer & Feld, LLP

[57] ABSTRACT

A computer system and method for allowing access to system partitions while an operating system is operational are disclosed. The system partitions are mounted by the operating system as logical drives so that the system partitions can be accessed as any other logical drive. In one embodiment, a method for accessing a special partition on at least one of a plurality of physical disks associated with a computer system running an operating system includes the operations of identifying a designated disk from the plurality of physical disks, each of the physical disks having a partition table associated therewith, and determining whether there is a special partition on the designated disk. The method further includes identifying the partition table associated with the designated disk when it is determined that the special partition is on the designated disk, and modifying a partition type in the partition table associated with the designated disk when it is determined that the special partition is on the designated disk.

20 Claims, 7 Drawing Sheets

METHOD AND SYSTEM FOR MOUNTING A SYSTEM PARTITION AS A LOGICAL DRIVE WHILE AN OPERATING SYSTEM IS OPERATIONAL BY MODIFYING A PARTITION TABLE

BACKGROUND OF THE INVENTION

1. Field of the Invention

The present invention relates to an operating system and, more particularly, to an operating system capable of supporting system partitions.

2. Description of the Related Art

Hardware vendors are able to customize their hardware systems to operating systems. One customization a hardware vendor can provide is a system partition on a boot-up disk drive of the hardware system. Such a system partition will contain additional programs, such as configuration and diagnostic programs, that a user may access.

The problem is that conventionally, such partitions cannot be accessed by the operating system. In fact, the Microsoft® Windows NT™ operating system (Microsoft Corp., Redmond, Wash.) will not recognize the system partitions and thus a user cannot access the system partition while the Microsoft Windows NT operating system is booted. The only way to access system partitions is for users to reboot the hardware system and press the function key F10 during the boot sequence. Hence, the need to reboot the hardware system to access a system partition is very burdensome to the user. In addition to being time consuming, the user loses the ability to use the operating system.

Thus, there is a need for techniques to allow access to system partitions without having to undergo the reboot sequence.

SUMMARY OF THE INVENTION

Broadly speaking, the invention is a technique for allowing access to system partitions while an operating system is operational. According to the invention, system partitions are mounted by the operating system as logical drives so that the system partitions can be accessed as any other logical drive.

The invention can be implemented in numerous ways, including as a device, a system, a method, or a computer readable medium. Several embodiments of the invention are discussed below.

As a method for accessing a special partition on at least one of a plurality of physical disks associated with a computer system running an operating system, an embodiment of the invention includes the operations of: identifying a designated disk from the plurality of physical disks, each of the physical disks having a partition table associated therewith; determining whether there is a special partition on the designated disk; identifying the partition table associated with the designated disk when it is determined that the special partition is on the designated disk, the partition table being stored to volatile memory by the operating system; and modifying a partition type in the partition table associated with the designated disk when it is determined that the special partition is on the designated disk. The method may also include the operation of assigning a drive letter to the special partition.

As a method for accessing a special partition on at least one of a plurality of physical disks associated with a computer system running an operating system, another embodiment of the invention includes the operations of: identifying a boot disk from the plurality of physical disks, each of the physical disks having partition information associated therewith; retrieving partition information from the boot disk; determining whether the special partition is present on the boot drive based on the retrieved partition information; modifying a partition type within the retrieved partition information for the special partition that is determined to be present on the boot drive; and defining a device name for the special partition that is determined to be present in the boot drive so that the operating system can then access the special partition as a logical disk.

As a computer system, an embodiment of the invention includes: a plurality of disk drives, one of the disk drives being a boot drive; an operating system for controlling the operation of the computer system; a read-only memory; a random-access memory; and a controller for running the operating system and executing other computer operations. The controller includes a partition mount controller for mounting a system partition for access by the operating system. The partition mount controller operates to: identify the boot drive from the plurality of disk drives, each of the disk drives having partition information associated therewith; retrieve partition information from the boot drive; determine whether the system partition is present on the boot drive based on the retrieved partition information; modify a partition type within the retrieved partition information for the system partition that is determined to be present on the boot drive; and define a device name for the system partition so that the operating system can then access the system partition as a logical disk.

As a computer readable media containing program instructions for accessing a special partition on at least one of a plurality of physical disks associated with a computer system running an operating system, an embodiment of the invention includes: first computer readable code for identifying a designated disk from the plurality of physical disks, each of the physical disks having partition information associated therewith; second computer readable code for retrieving partition information from the designated disk; third computer readable code for determining whether the special partition is present on the designated drive based on the retrieved partition information; fourth computer readable code for modifying a partition type within the retrieved partition information for the special partition that is determined to be present on the designated drive; and fifth computer readable code for defining a device name for the special partition so that the operating system can then access the special partition as a logical disk.

The advantages of the invention are numerous. One advantage of the invention is that a user can access a system partition while the operating system is operational. This results in more efficient use of the resources on the system partition as well as greater user satisfaction because the burdensome requirement of rebooting to access the system partition is eliminated.

Other aspects and advantages of the invention will become apparent from the follow ing detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention pertains to a technique for allow ing access to system partitions while an operating system is operational. According to the invention, system partitions are mounted by the operating system as logical drives so that the system partitions can be accessed as any other logical drive.

Embodiments of the invention are discussed below with reference to FIGS. 1–7. However, those skilled in the art will readily appreciate that the detailed description given herein with respect to these figures is for explanatory purposes only, as the invention extends beyond these limited embodiments.

Figure 1:
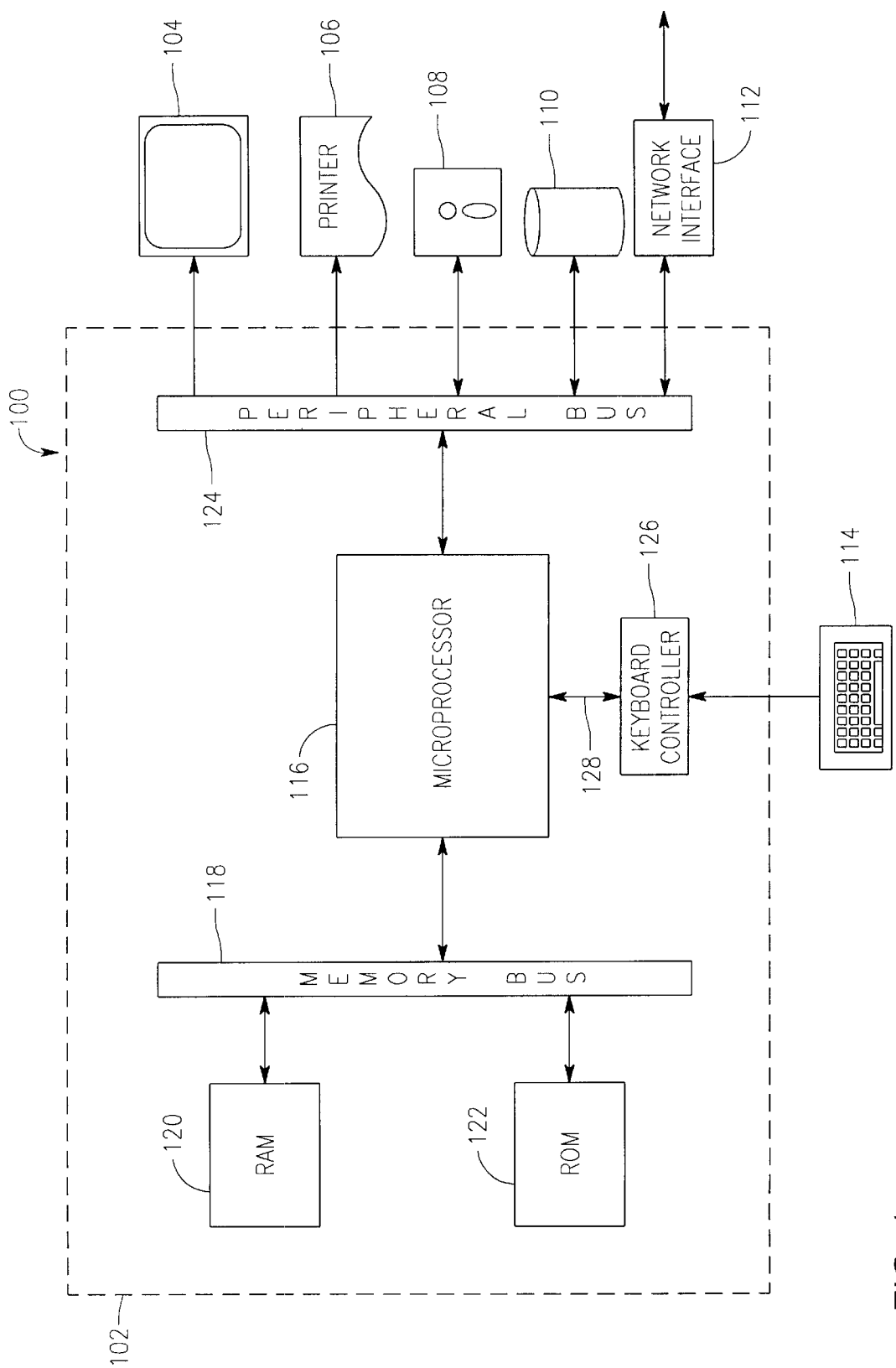
FIG. 1 is a block diagram of an exemplary computer system for carrying out the processing according to the invention.

FIG. 1 is a block diagram of an exemplary computer system 100 for carrying out the processing according to the invention. The computer system 100 includes a digital computer 102, a display screen (or monitor) 104, a printer 106, a floppy disk drive 108, a hard disk drive 110, a network interface 112, and a keyboard 114. The digital computer 102 includes a microprocessor 116, a memory bus 118, random access memory (RAM) 120, read only memory (ROM) 122, a peripheral bus 124, and a keyboard controller 126. The digital computer 100 can be a personal computer (such as an IBM compatible personal computer), a workstation computer (such as a Sun Microsystems or Hewlett-Packard workstation), or some other type of computer.

The microprocessor 116 is a general purpose digital processor which controls the operation of the computer system 100. The microprocessor 116 can be a single-chip processor or can be implemented with multiple components. Using instructions retrieved from memory, the microprocessor 116 controls the reception and manipulation of input data and the output and display of data on output devices. According to the invention, as described in detail below, a particular function of microprocessor 116 is to enable access to a system partition on a physical disk, such as the hard disk drive 110, while the operating system is running.

The memory bus 118 is used by the microprocessor 116 to access the RAM 120 and the ROM 122. The RAM 120 is used by the microprocessor 116 as a general storage area and as scratch-pad memory, and can also be used to store input data and processed data. The ROM 122 can be used to store instructions or program code followed by the microprocessor 116 as well as other data.

The peripheral bus 124 is used to access the input, output, and storage devices used by the digital computer 102. In the described embodiment, these devices include the display screen 104, the printer device 106, the floppy disk drive 108, the hard disk drive 110, and the network interface 112. The keyboard controller 126 is used to receive input from the keyboard 114 and send decoded symbols for each pressed key to the microprocessor 116 over bus 128.

The display screen 104 is an output device that displays images of data provided by the microprocessor 116 via the peripheral bus 124 or provided by other components in the computer system 100. The printer device 106 when operating as a printer provides an image on a sheet of paper or a similar surface. Other output devices such as a plotter, typesetter, etc. can be used in place of, or in addition to, the printer device 106.

The floppy disk drive 108 and the hard disk drive 110 can be used to store various types of data. The floppy disk drive 108 facilitates transporting such data to other computer systems, and hard disk drive 110 permits fast access to large amounts of stored data.

The microprocessor 116 together with an operating system operate to execute computer code and produce and use data. The computer code and data may reside on the RAM 120, the ROM 122, or the hard disk drive 120. The computer code and data could also reside on a removable program medium and loaded or installed onto the computer system 100 when needed. Removable program mediums include, for example, compact disc ROM (CD-ROM), personal computer card (PC-CARD), floppy disk and magnetic tape.

It is not uncommon for the hard disk drive 120 to include a plurality of partitions. For example, with Microsoft Windows NT operating system, a disk can have a primary partition and an extended partition. Some hardware vendors, however, go further and seek to enhance their hardware system by placing a system partition on the hard disk drive 120 to include additional programs, files or other data for a user. The programs, files or other data on a system partition can have various purposes. As an example, a system partition might contain configuration and diagnostic programs that a user may wish to use for troubleshooting.

The network interface 112 is used to send and receive data over a network connected to other computer systems. An interface card or similar device and appropriate software implemented by the microprocessor 116 can be used to connect the computer system 100 to an existing network and transfer data according to standard protocols.

The keyboard 114 is used by a user to input commands and other instructions to the computer system 100. Other types of user input devices can also be used in conjunction with the present invention. For example, pointing devices such as a computer mouse, a track ball, a stylus, or a tablet can be used to manipulate a pointer on a screen of a general-purpose computer.

Figure 2:
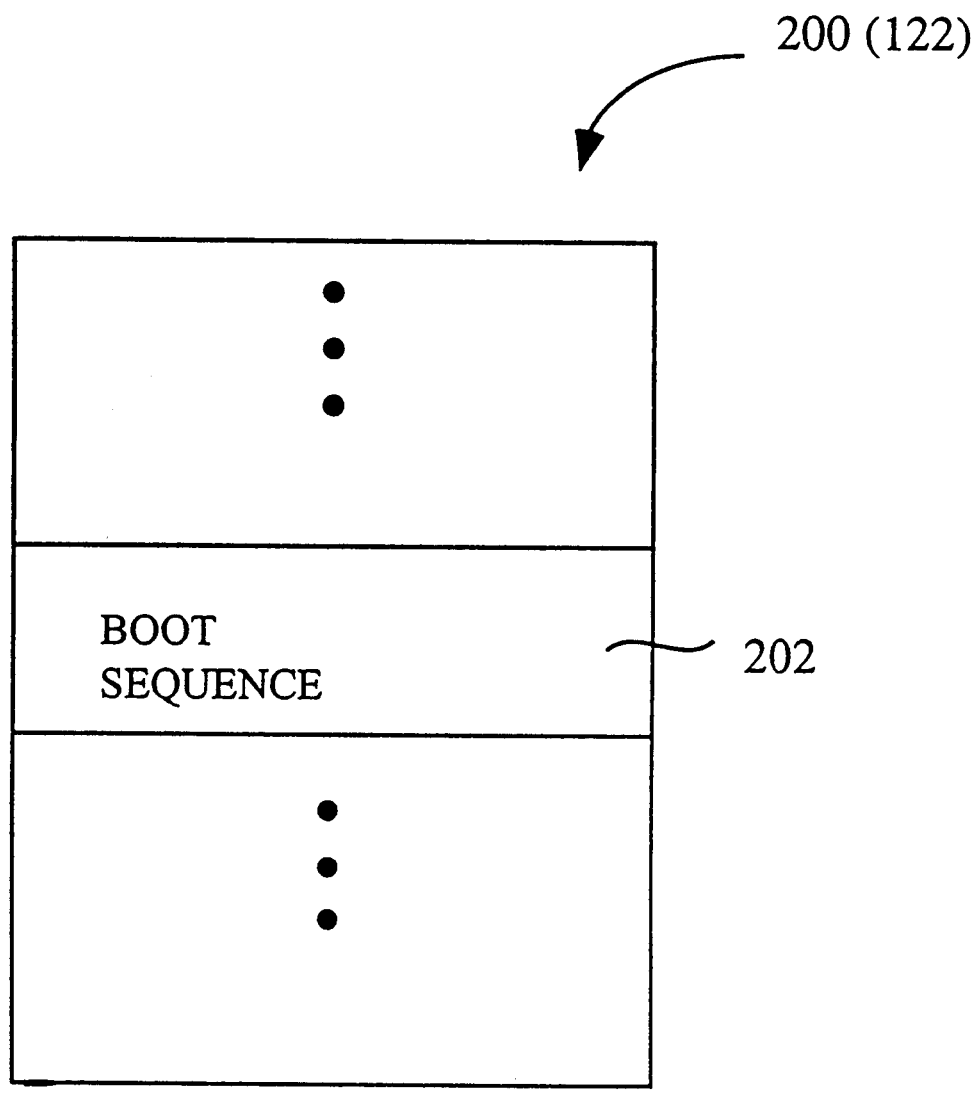
FIG. 2 is a block diagram of a read-only memory (ROM) for use with the computer system illustrated in FIG. 1.

FIG. 2 is a block diagram of a ROM 200 for use with the computer system 100 illustrated in FIG. 1. The ROM 200 may be used as the ROM 122 in FIG. 1. The ROM 200 stores executable computer code and other data for use by the computer system 100. As is conventional, the ROM 200 includes a boot sequence 202 within the ROM 200. When the computer system 100 is "booted," microprocessor 116 executes the executable computer code contained in the boot sequence 202 of the ROM 200. A primary function of the boot sequence 202 is to set up and initialize the operating system and various physical components of the computer system 100. Normally, the boot sequence 202 causes the operating system to be retrieved from the hard disk drive 120.

Figure 3:
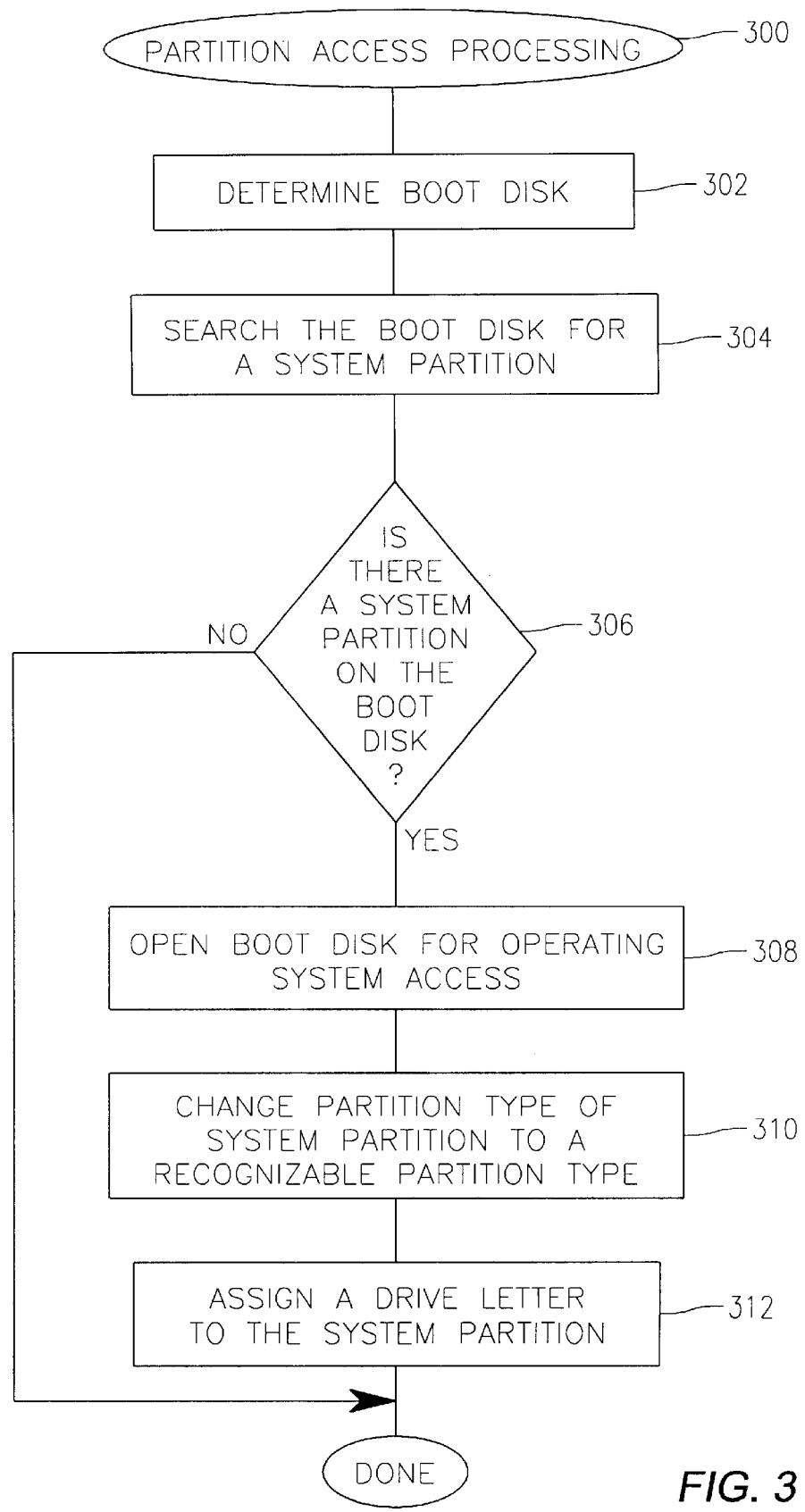
FIG. 3 is a flow diagram of partition access processing according to a basic embodiment of the invention.

FIG. 3 is a flow diagram of partition access processing 300 according to a basic embodiment of the invention. The partition access processing 300 is processing performed by a computer system (e.g., the computer system 100) by executing computer code from a storage area. The storage area, for example, may be the floppy disk drive 108, the hard disk drive 110, the RAM 120, or the ROM 122.

During the partition access processing 300, a boot disk is initially determined in block 302. The boot disk is the particular storage area (e.g., disk) from which the computer system 100 has been "booted." With respect to the computer system 100, the boot disk is normally the floppy disk drive 108 or the hard disk drive 110. However, in general, the boot disk for various computer systems is not fixed and changes from system to system. Also, in some computer systems, there are multiple drives available such as multiple hard disk drives, multiple floppy disk drives, multiple CD-ROM drives and the like, any of which could serve as the boot disk. Hence, for the partition access processing 300 to be generally applicable, the boot disk is determined in block 302 of the partition access processing 300 for the computer system on which the partition access processing 300 is executed.

After determining the boot disk in block 302, the boot disk is then searched for a system partition in block 304. The searching in block 304 can be performed by checking a partition table of the boot disk for a system partition identifier. The partition table is contained within disk configuration information on the boot disk (see FIG. 4). The system partition is a special partition of the boot disk. The system partition contains computer code, files or other data that is useful for the computer system. For example, a system partition may include configuration and/or diagnostic programs. One possible structure and organization of partitions on a physical disk are described below in detail with reference to FIG. 4. Another possible structure and organization of partitions could place the system partition at the end of the disk.

Next, in decision block 306, it is determined whether the searching performed in block 304 has found a system partition on the boot disk. When it is determined in decision block 306 that there is a system partition on the boot disk, then the boot disk is opened at block 308 for access via the operating system. Next, in block 310, the partition type of the system partition is changed to a recognizable partition type. In other words, conventionally, a system partition is a partition that is not recognizable by the operating system because it is an add-on partition that was not capable of being readily accessed. Hence, the partition type of the system partition is changed in block 310 such that the operating system is tricked into thinking that the partition type is of a type that is ordinarily recognized by the operating system. Following block 310, a drive letter is assigned in block 312 to the system partition. The drive letter being assigned in block 312 to the system partition can then be used by user to access the system partition as if it were a disk drive (i.e., logical disk drive) of the operating system.

Following block 310, the partition access processing 300 is complete and ends. Also, in the case in which it is determined in decision block 306 that there is no system partition on the boot disk, then the partition access processing 300 ends early by bypassing blocks 308 through 312.

Figure 4:
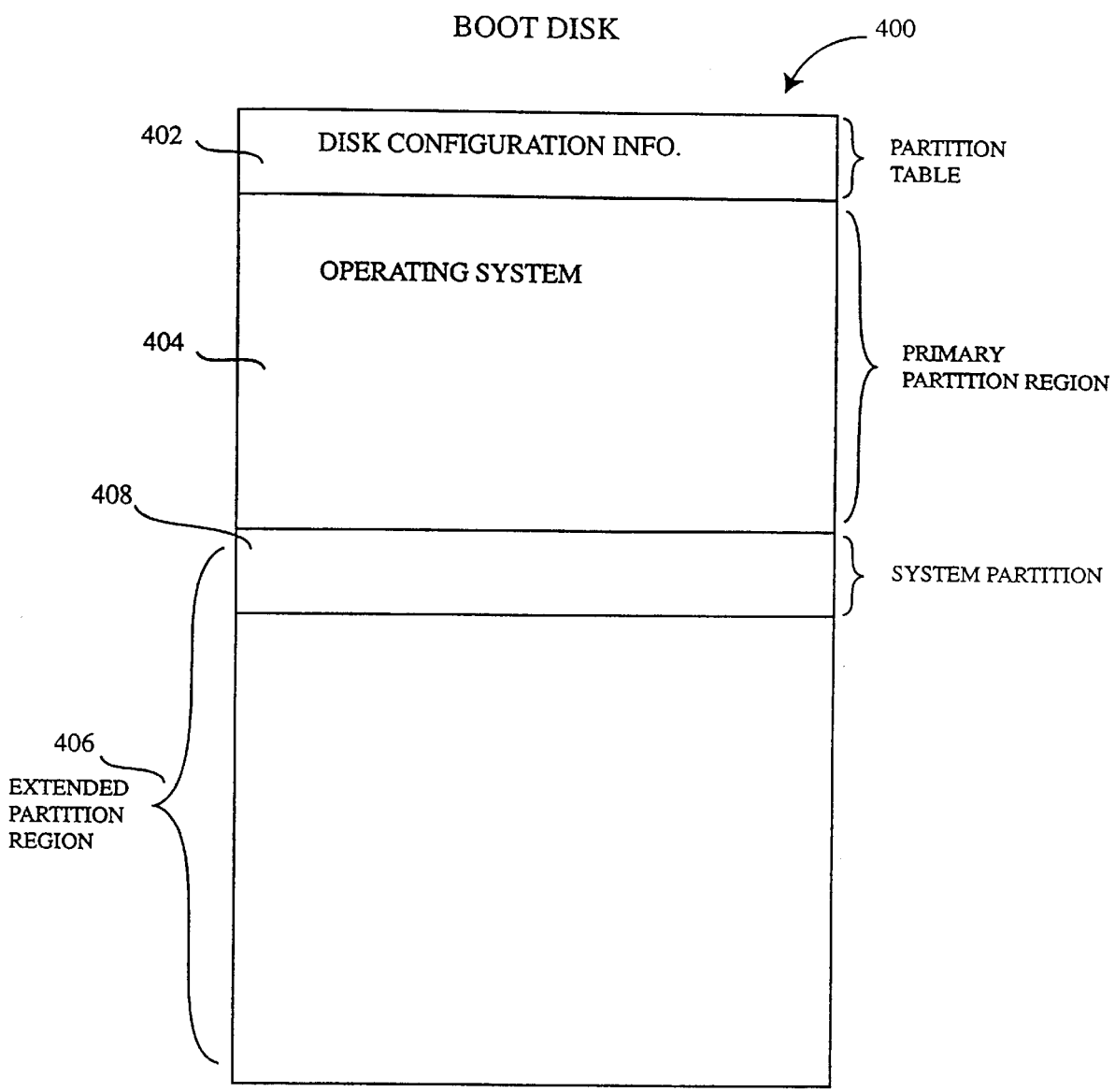
FIG. 4 illustrates an exemplary boot disk for use with the invention.

FIG. 4 illustrates an exemplary boot disk 400 for use with the invention. The boot disk 400 includes disk configuration information 402, a primary partition region 404, and an extended partition region 406. The disk configuration information 402 includes a partition table containing information about the various partitions and other arrangement or layout information for the boot disk 400. The primary partition region 404 contains an operating system. The extended partition region 406 can include additional partitions, including a system partition 408. One example of a system partition is the PROLIANT 1500 System Partition Utilities provided by Compaq Computer Corporation of Houston, Tex. Hence, the exemplary boot disk 400 illustrated in FIG. 4 happens to include a system partition and has a structure and organization suitable for use with the Window NT operating system by Microsoft, Corp.

Figure 5:
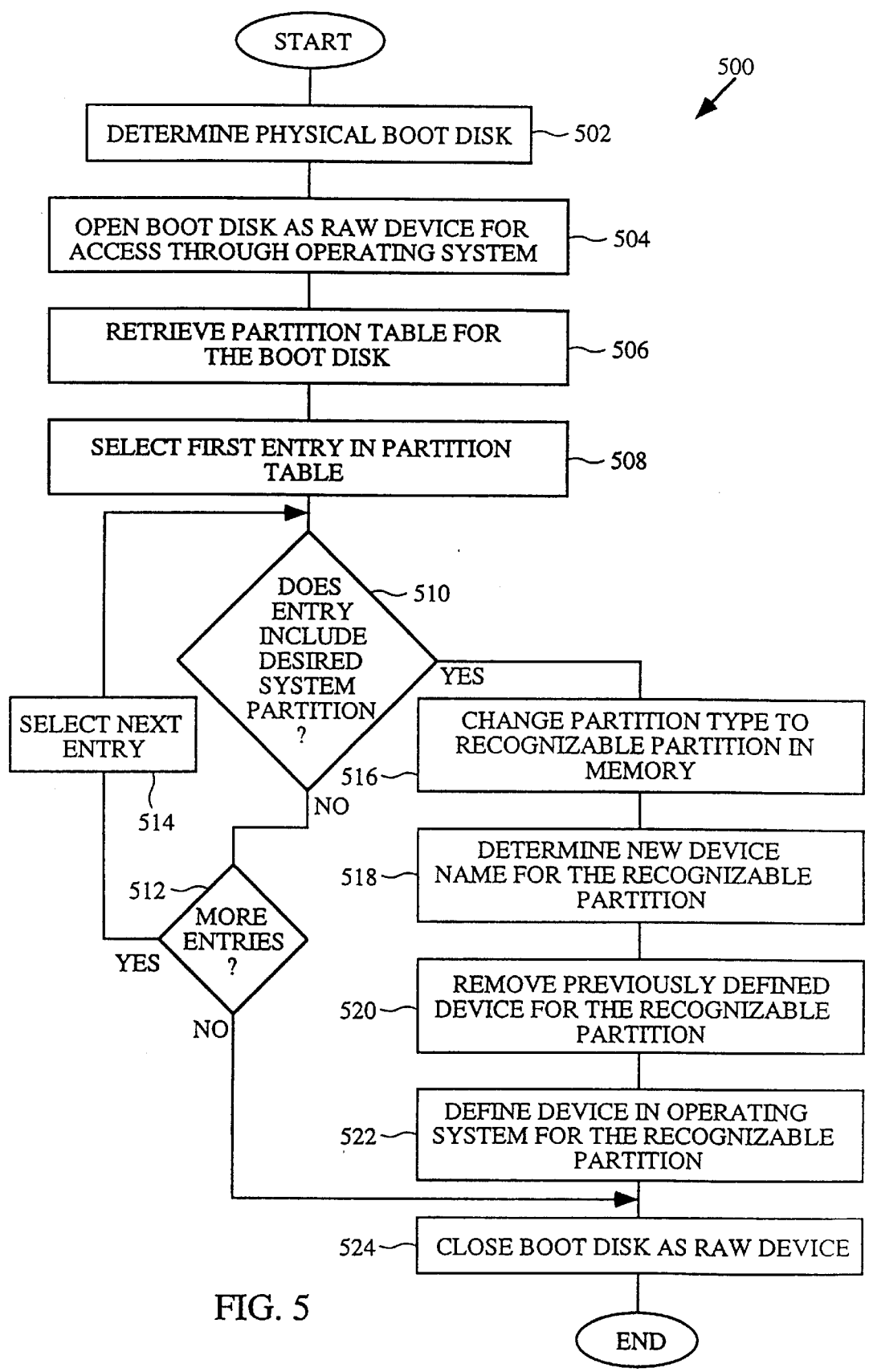
FIG. 5 is a flow diagram of partition mount processing according to an embodiment of the invention.

FIG. 5 is a flow diagram of partition mount processing 500 according to an embodiment of the invention. The partition mount processing 500 is preferably performed by a computer system when directed by a user to mount a particular system partition so that the system partition can be readily accessed by the user and/or operating system. In other words, although the partition mount processing 500 performs the same overall function as the partition access processing 300, the partition mount processing 500 describes an embodiment of the invention in greater detail than does the partition access processing 300.

During the partition mount processing 500, a physical boot disk for the computer system 100 is determined in block 502. This can be achieved by an operating system function call that determines a path to the boot drive. In one example, the function call can look for a particular system partition file (e.g., "cf.exe" file of COMPAQ Configuration Utility, Compaq Computer Corporation, Houston, Tex.) on the physical drives it checks when looking for the boot disk. For example, with Windows NT, the CreateFile function can be used to see if the particular system partition file is present.

Next, the boot disk is opened in block 504 as a raw device for access through the operating system. By opening the boot disk as a raw device, the operating system is then able to access the boot disk at a low level. As an example, a system call (DeviceIOControl) to the I/O manager of Windows NT can be used to open the boot disk as a raw device.

The partition table for the boot disk is then retrieved in block 506. The partition table is retrieved from the disk configuration information area 402 of the boot disk 400. Typically, the partition table includes a plurality of entries, each of the entries corresponds to a partitioned area of the boot disk 400 and includes the starting and ending areas of the partition.

After the partition table is retrieved in block 506, a first entry in the partition table is selected in block 508. Then, the entries in the partition table are searched (beginning with the first entry) to locate a desired system partition in decision blocks 510 and 512. More particularly, it is determined in decision block 510 whether the selected entry includes the desired system partition. If not, it is determined in decision block 512 whether there are more entries in the partition table to be considered. If there are more entries to be considered, a next entry in the partition table is selected in block 514 and the partition mount processing 500 returns to repeat the decision block 510 and subsequent blocks. As an example, the entries in the partition table include among other fields a PartitionType field, and the entries in the partition table are searched in decision block 520 for a partition type of a specified value that is associated with the desired system partition. Hence, if the desired system partition is identified by the value $12_{HEX}$ (the subscript "HEX" denotes hexadecimal notation), then the search through the entries looks for the value $12_{HEX}$ in the PartitionType field.

In any case, when it is determined in decision block 510 that the selected entry includes the desired system partition, the system partition may be mounted for use by the operating system. In particular, the partition type for the desired system partition is to changed in block 516 to a recognizable partition. The change in the partition type is changed within the copy of the partition table that is stored in volatile memory (e.g., RAM 120). Note that when the operating system is booted, the operating system reads the partition table from the boot disk 400 and stores it in the volatile memory. By changing the partition type for the desired system partition in block 516, the operating system is tricked into thinking that the system partition is a conventional type of partition which it recognizes. For example, the partition type of $12_{HEX}$ within the PartitionType field for the desired system partition serves to identify (or distinguish) the desired system partition from all other partitions, but in doing so makes the desired system partition insupportable or unrecognizable by the operating system. Hence, changing in block 516 the PartitionType field from $12_{HEX}$ to $01_{HEX}$ serves to identify a file allocation table (FAT) partition. A FAT partition is a normal Disk Operating System (DOS) partition that is understood by most operating systems (e.g., Windows NT from Microsoft Corp.). In general, the PartitionType field can be changed to an identifier that the operating system supports.

After changing the partition type in block 516, a new device name for the recognizable partition is determined in block 518. As an example, the new device name specifies for the operating system a path or handle to the desired system partition. An exemplary path or handle to a system partition could as an example be "\device\harddisk0\partition2" for Windows NT.

Next, a previously defined device definition for the desired system partition is removed in block 520 if any exists. The removal of the previously defined device definition, if any, operates to clean out previously stored references to a previously defined device so that the device can be redefined with a new, and possibly, changed definition. Thereafter, a device is defined in the operating system for the recognizable partition in block 522. By defining a device, the operating system sets up a logical disk drive in accordance with the new device name. The defined device definition is stored in volatile-memory (e.g., RAM 120) for subsequent use by the operating system. The logical disk drive thus defined is also preferably given a symbolic name. As an example, the logical drive representing the desired system partition could be "X:". Hence, when the user desires to access the system partition, the user simply uses the drive indicator (e.g., X:) for access to the system partition like any other logical drive.

Following block 522, or following the decision block 512 in the case when there are no additional entries, the connection to the boot disk as a raw device is closed in block 524. Here, the connection created in block 504 is terminated as it is no longer needed. Following block 524, the partition mount processing 500 is complete and ends.

The partition mount processing 500 can be activated in a number of ways. One way to activate the partition mount processing is as a utility program where a command is entered on a command line to start the program. Furthermore, besides the partition mounting provided by the partition mount processing 500, the invention can also operate to unmount a previously mounted partition. The unmounting can be implemented as a utility program and would essentially perform block 520 of FIG. 5.

Moreover, although the system partition in the embodiment described above is found on the boot disk, the invention is broadly applicable to situations in which the system partition is on any disk.

The invention is particularly suited for use with the Microsoft Windows NT operating system. Hence, an overview discussion on Windows NT is provided below.

Figure 6:
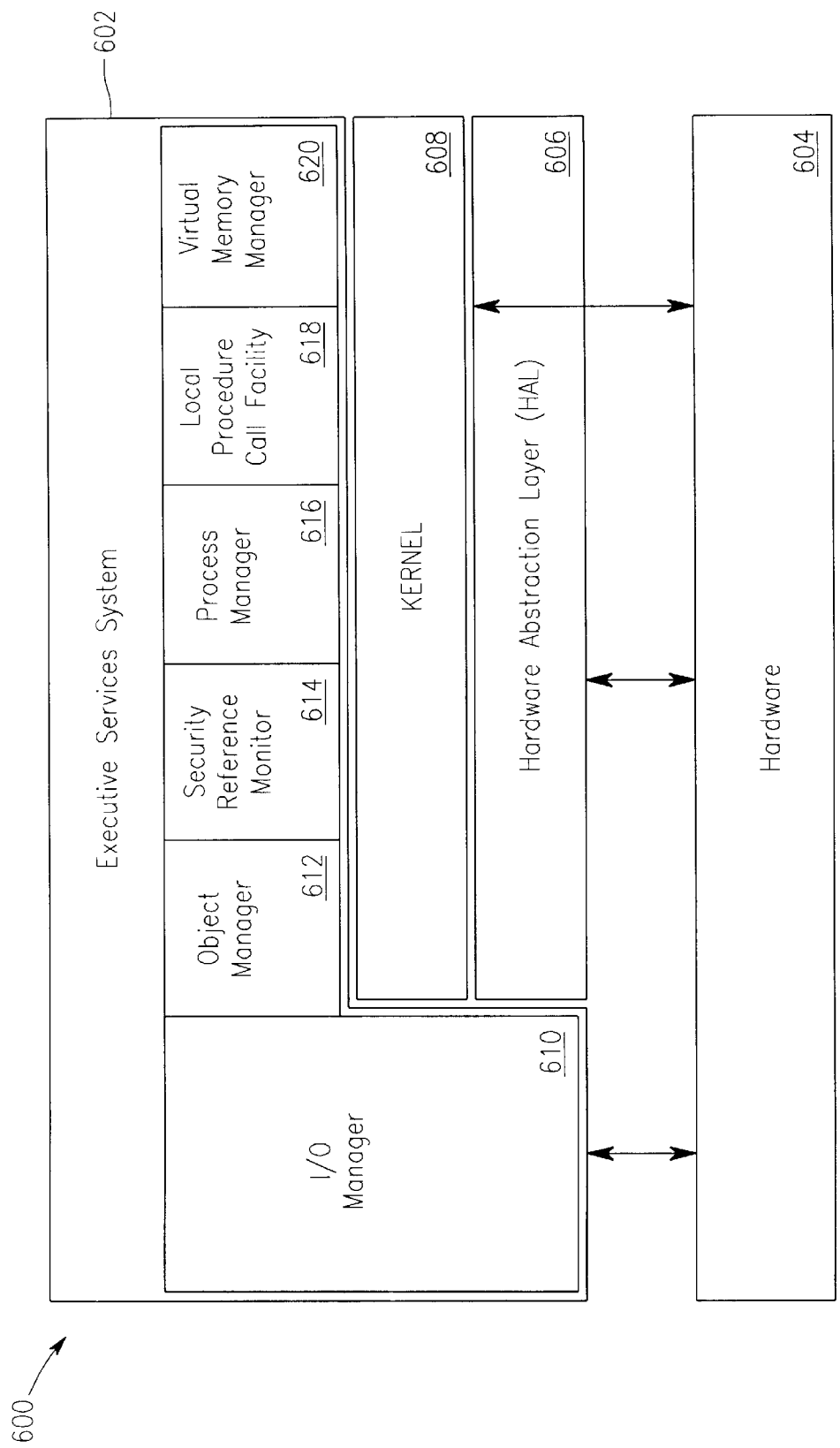
FIG. 6 is a block diagram of the architecture of Microsoft Windows NT.

FIG. 6 is a block diagram of the architecture of Microsoft Windows NT operating system 600. The Windows NT operating system 600 is a modular operating system composed of layers. The Windows NT operating system 600 includes an executive services system 602 which interacts with hardware 604 associated with a computer system on which the Windows NT operating system 600 executes. The executive services system 602 includes a hardware abstraction layer (HAL) 606, a kernel 608, and a set of services 610–620. The environment subsystems (not shown) which interact with the Windows NT operating system 600 can use any of the services 610–620.

Between the services 610–620 of the Windows NT operating system 600 and the hardware 604 is the HAL 606. Although the kernel 608 and the executive services system 602 could also directly interact with the hardware 604, the primary interaction with the hardware 604 by the Windows NT operating system 600 is through the HAL 606. The HAL 606 is a layer of software provided by the hardware manufacturer that hides (or abstracts) hardware differences from higher layers of the Windows NT operating system 600. As a result, different types of hardware all look alike to an operating system. Hence, it is not necessary to specifically tailor an operating system to the hardware with which it communicates.

The HAL 606 contains routines (function calls) that allow a single device driver to support the same device on numerous hardware platforms. The routines within the HAL 606 are typically called from either the base operating system (e.g., the kernel 608) or from device drivers residing within the I/O Manager 610. Accordingly, the HAL 606 enables device drivers to support a wide variety of input/output (I/O) architectures instead of either being restricted to a single hardware model or needing extensive adaptation for each new hardware platform.

The kernel 608 schedules activities for the computer system to perform. In the Windows NT operating system 600, the kernel 608 schedules the activities into threads. The kernel 608 dispatches threads in a way that ensures that the processor or processors of the computer system are always kept busy. The kernel 608 works closely with the HAL 606. Threads are defined in the context of a process which represents an address space, a set of objects visible to the process, and a set of threads that runs in the context of the process. Objects are resources that can be manipulated by the operating system.

The executive services system 602 includes the set of services including I/O manager 610, object manager 612, security reference monitor 614, process manager 616, local procedure call facility 618, and virtual memory manager 620. These services 610–620 are the interface between user-mode environment subsystems and the kernel 608. The I/O manager 610 manages all input and output for the Windows NT operating system 600. The object manager 612 provides uniform rules for retention, naming and security of objects. The security reference monitor 614 ensures that applications cannot access system resources without authorization. The process manager 616 manages the creation and deletion of processes. The local procedure call facility 618 manages local procedure calls (LPC) which involves message passing between applications and the environment subsystems. The virtual memory manager 620 manages the translation of virtual addresses to physical pages in memory.

Figure 7:
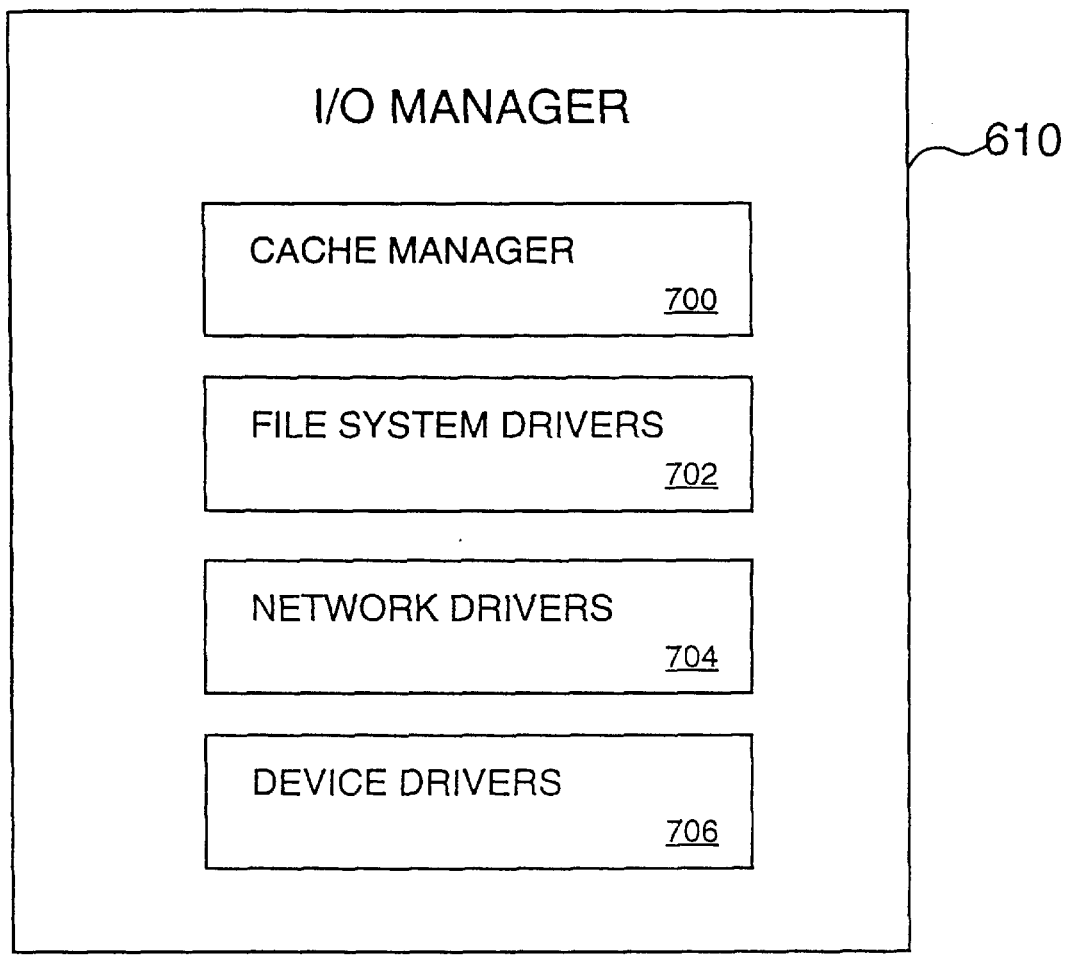
FIG. 7 is a block diagram of an input/output (I/O) manager illustrated in FIG. 6.

FIG. 7 is a block diagram of the I/O manager 610 illustrated in FIG. 6. The I/O manager 610 includes, for example, a cache manager 700, file system drivers 702, network drivers 704 and device drivers 706. According to the Windows NT operating system 600, the architecture within the I/O manager 610 is layered so that separate drivers implement logically distinct layers of processing. For example, drivers in the lowest layer (device drivers 706) manipulate the physical devices of the computer system, while other drivers are then layered on top of the device drivers 706. The higher-level drivers 700, 702 and 704 pass logical I/O requests down to the device drivers 706 which in turn access the physical devices of the computer system on their behalf.

Additional details on the Windows NT operating system can, for example, be found in the Microsoft Windows NT Resource Guide (for Windows NT workstation and Windows NT server version 3.51), Microsoft Press, 1995, or in Inside Windows NT, by Helen Custer, Microsoft Press, 1993, both of which are hereby incorporated by reference.

The invention also facilitates the updating of files on the system partition. In other words, once access to a system partition becomes available while the operating system is operational, then the files on the system partition can be updated while the operating system is operational. Accordingly, a software utility can cause a system. partition to be updated while the operating system is operational. An administrator of a network could also remotely update system partitions on a server machine over the network using such a software utility. In an implementation using Windows NT, software utilities are able to mount, unmount and share a system partition all while Windows NT is running. The mounting provides access to the system partition, the unmounting removes access to the system partition, and the updating allows the system partition to be updated. The software utilities can communicate with the Windows NT registry to interface with these utilities. The three values under the registry key "HKEY_LOCAL_MACHINE\System\CurrentControlSet\Services\SysPart\Parameters" may be used to control the command mechanism with the utilities. With Windows NT, is these values of the key registry are as follows:

ShareName: REG_SZ: Defaults to SYSPART$. Must contain a valid Windows NT share name. Security on the system partition share is automatically restricted to FULL CONTROL for the Windows NT group of administrators. The dollar sign ($) at the end of the share name indicates that the share is hidden from normal user viewing.

State Request: REG_DWORD: Defaults to 2 where 0=Unmount, 1=Mount, 2=Mount & Share. Other values are invalid.

Use Drive: REG_SZ: Defaults to NULL. Values accepted can be B:

through Z: It is recommended to let the utilities decide which drive letter to use instead of specifying one.
The service response mechanism is located under the registry key "HKEY_LOCAL_MACHINE\System\CurrentControlSet\Services\SysPart\Status."

The invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, and optical data storage devices. The computer readable medium can also be distributed over a network coupled computer systems so that the computer readable code is stored and executed in a distributed fashion.

The advantages of the invention are numerous. As noted earlier, one advantage of the invention is that a user can access a system partition while the operating system is operational. This results in more efficient use of the resources on the system partition as well as greater user satisfaction because the burdensome requirement of rebooting to access the system partition is eliminated. The invention also allows the user to access the system partition through the operating system as a logical disk drive.

The invention employs various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. An exemplary structure for the invention is described above with reference to FIG. 1.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for accessing a special partition on at least one of a plurality of physical disks associated with a computer system running an operating system, said method comprising:

(a) identifying a designated disk from the plurality of physical disks, each of the physical disks having a partition table associated therewith;

(b) determining whether there is a special partition on the designated disk;

(c) identifying the partition table associated with the designated disk when it is determined that the special partition is on the designated disk, the partition table associated with the designated disk being stored to volatile memory by the operating system; and (d) modifying a partition type in the partition table associated with the designated disk and stored in the volatile memory when it is determined that the special partition is on the designated disk, thereby allowing access to the special partition as a logical drive while the computer system is running the operating system and without having to reboot the computer system with the operating system.

2. A method as recited in claim 1, wherein the special partition is a system partition including at least one of configuration and diagnostic programs.

3. A method as recited in claim 1, wherein the computer system includes random-access memory,
wherein said identifying (c) comprises:
(c1) reading the partition table associated with the designated disk; and
(c2) storing the partition table read to the random-access memory, and
wherein said modifying (d) of the partition type within the partition table for the special partition modifies the partition table stored in the random-access memory.

4. A method as recited in claim 1, wherein said method further comprises:
(e) assigning a drive letter to the special partition.

5. A method as recited in claim 4, wherein a user of the computer system is able to access the special partition while the operating system is running by using the assigned drive letter.

6. A method for accessing a special partition on at least one of a plurality of physical disks associated with a computer system running an operating system, said method comprising:
(a) identifying a boot disk from the plurality of physical disks, each of the physical disks having partition information associated therewith;
(b) retrieving partition information from the boot disk;
(c) determining whether the special partition is present on the boot disk based on the retrieved partition information;
(d) modifying a partition type within the retrieved partition information for the special partition that is determined to be present on the boot disk; and
(e) defining a device name for the special partition that is determined to be present on the boot disk so that the operating system can then access the special partition as a logical disk while the computer system is running the operating system and without having to reboot the computer system with the operating system.

7. A method as recited in claim 6, wherein the computer system includes random-access memory, and wherein said retrieving (b) comprises:
(b1) reading the partition information from the boot disk; and
(b2) storing the partition information read to the random-access memory.

8. A method as recited in claim 6, wherein said defining (e) of the device name further assigns a symbolic drive name for the logical disk formed from the special partition.

9. A method as recited in claim 6, wherein the computer system includes random-access memory;
wherein said retrieving (b) comprises:
(b1) reading the partition information from the boot disk; and
(b2) storing the partition information read to the random-access memory, and
wherein said modifying (d) comprises modifying the partition type for the special partition within the retrieved partition information stored in the random-access memory.

10. A method as recited in claim 6, wherein the special partition is a system partition including configuration or diagnostic programs.

11. A method as recited in claim 6, wherein the special partition is indicated by a specific partition type identifier.

12. A method as recited in claim 11, wherein said determining (c) comprises:

(c1) searching through the retrieved partition information for a partition of the boot disk having the specific partition type identifier; and
(c2) determining that the special partition is present on the boot disk when said searching (c1) finds the specific partition type identifier on the boot disk.

13. A computer system, comprising:
a plurality of disk drives, one of said disk drives being a boot drive;
an operating system for controlling the operation of said computer system;
a read-only memory;
a random-access memory; and
a processor that executes said operating system and that executes other computer operations, said processor executing partition mount operations to function as a partition mount controller for mounting a system partition for access by said operating system, wherein said partition mount controller operates to identify the boot drive from the plurality of disk drives, each of the disk drives having partition information associated therewith; retrieve partition information from the boot drive; determine whether the system partition is present on the boot drive based on the retrieved partition information; modify a partition type within the retrieved partition information for the system partition that is determined to be present on the boot drive; and define a device name for the system partition so that said operating system can then access the system partition as a logical disk while the computer system is running the operating system and without having to reboot the computer system with the operating system.

14. A computer system as recited in claim 13, wherein said partition mount controller further operates to assign a symbolic drive name for the logical disk formed from the system partition.

15. A computer system as recited in claim 14, wherein a user of said computer system is able to access the system partition while said operating system is running by using the symbolic drive name.

16. A computer readable media containing program instructions for accessing a system partition on at least one of a plurality of physical disks associated with a computer system running an operating system, said computer readable media comprising:
first computer readable code for identifying a designated disk from the plurality of physical disks, each of the physical disks having partition information associated therewith;
second computer readable code for retrieving partition information from the designated disk;
third computer readable code for determining whether the system partition is present on the designated disk based on the retrieved partition information;
fourth computer readable code for modifying a partition type within the retrieved partition information for the system partition that is determined to be present on the designated disk; and
fifth computer readable code for defining a device name for the system partition so that the operating system can then access the system partition as a logical disk while the computer system is running the operating system and without having to reboot the computer system with the operating system.

17. A computer readable media as recited in claim 16, wherein said computer readable media further comprises:

sixth computer readable code for assigning a drive letter to the system partition.

18. A computer readable media as recited in claim 16, wherein said first computer readable code identifies a boot disk as the designated disk.

19. A computer readable media as recited in claim 16, wherein said second computer readable code comprises:

computer readable code for reading the partition information associated with the designated disk; and computer readable code for thereafter storing the partition information that has been read to a random-access memory.

20. A computer readable media as recited in claim 19, wherein said fourth computer readable code modifies the partition type within the partition information for the system partition stored in the random-access memory.

* * * * *